Oct. 6, 1936.   C. D. PARKHILL   2,056,906
MAGNETIC RAKE
Filed April 20, 1935
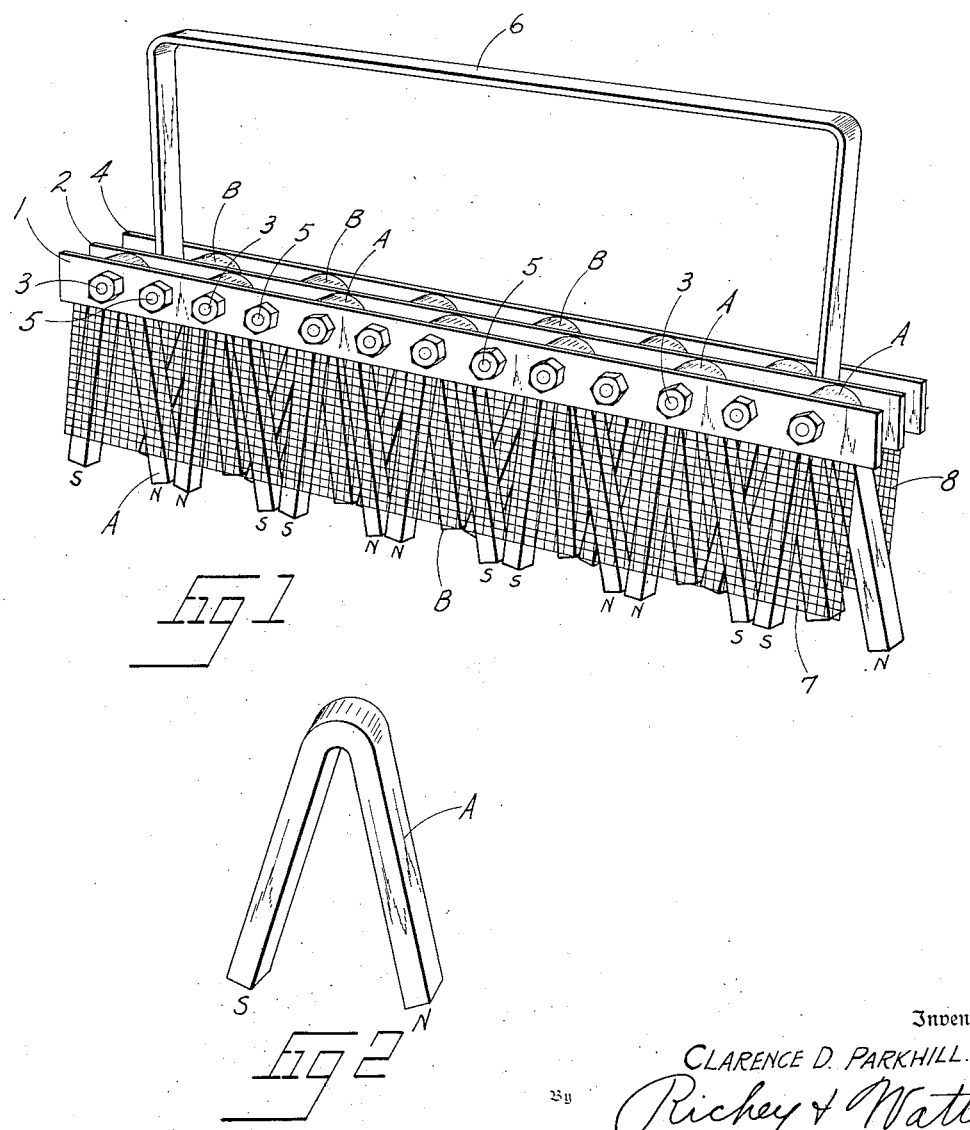
Inventor
CLARENCE D. PARKHILL.
By Richey & Watts
Attorney Patented Oct. 6, 1936

2,056,906

UNITED STATES PATENT OFFICE 2,056,906

MAGNETIC RAKE

Clarence D. Parkhill, Greenville, Mich., assignor to Ferro Enamel Corporation, Cleveland, Ohio, a corporation of Ohio Application April 20, 1935, Serial No. 17,521

2 Claims. (Cl. 209—217)

This invention relates to apparatus for removing particles of foreign material from liquids and more particularly to means for removing particles of iron or other magnetic substances from tanks containing a fluid mixture into which articles are dipped to coat with the mixture.

In the porcelain enameling art it is common practice to prepare a mixture of ground coat frit and water in a dipping tank. The enamel is dipped into this tank to give it the desired covering of ground coat frit, burned and then given a finish coat of, for example, white enamel frit and again burned. It is usual to use magnetic separators of various types for removing iron particles from the dry milled frit before it is mixed with water in the dipping tank. However the ground coat dipping tank frequently becomes contaminated with iron particles which are brought into the tank by the ware itself. These particles may be in the form of filings, slivers of iron from burrs on the edges of sheared or trimmed parts, etc. A check on almost every tank of ground coat enamel in which ware has been dipped for two or three hours will reveal this contamination. Some of the iron particles which are deposited in the tank from the ware stick to the ware and remain on during the burning of the ground coat.

When the article is sprayed with a finish coat of, for example, white enamel and burned, black or brown spots will occur at the majority of places where the iron particles stuck to the ground coat.

In the past this has been a source of considerable trouble and has caused a high percentage of rejections. In some plants it has been the practice to completely discard the contents of the ground coat dipping tank after use for some time although a large quantity of frit still remained in the tank.

It is among the objects of my invention to provide an extremely simple, compact and inexpensive device for removing magnetic particles from a tank of liquid, such as an enamel dipping tank; to provide a magnetic rake which may be easily constructed from parts readily available and which may be used to free a dipping tank of magnetic particles in a very few minutes and without the necessity of delaying production for any appreciable period of time; to provide a magnetic rake whereby the maximum magnetic field is presented to the liquid at all times; and to provide a portable magnetic rake which can be readily handled by one person.

The above and other objects of my invention will appear from the following description of a preferred embodiment thereof, reference being had to the accompanying drawings, in which—

Figure 1 is a perspective view illustrating my improved magnetic rake.

Figure 2 is a detached perspective view of one of the magnet elements.

Generally speaking, my magnetic rake comprises two rows of hairpin shaped, horseshoe type permanent magnets, the rows being spaced apart and the magnets of the adjacent rows being arranged in staggered relation. As is seen in Figure 1 the front row of hairpin magnets A have their closed ends clamped between the front bar 1 and the center bar 2 by means of the bolts 3 which pass through the U-ends of the hairpin magnets and on through the rear bar 4. The rear row of magnets B are clamped between the rear bar 4 and the center bar 2 by the bolts 5 which also extend through all three bars 1, 2, and 4. As is clearly seen in Figure 1 the center bar 2 spaces the magnets A from the magnets B and the magnets B are arranged in staggered relation to the magnets A. A handle member 6 is suitably secured to the bars 2 and 4 and strips of wire mesh 7 and 8 may be clamped between the front bar 1 and the magnets A and between the rear bar 4 and the magnets B.

The poles of the magnets A are indicated in Figure 1 by the letters N and S, referring to the north and south poles respectively, and it will be seen that the magnets are disposed so that like poles of adjacent magnets are together. Preferably the lower ends of magnets A are slightly separated from each other although no harm will be done if they contact with each other.

In Figure 2 I have illustrated, in detached view, one of the magnets A. These magnets may conveniently be of the type used in the Model "T" Ford automobile which are readily available at low cost. However, it will be understood that any suitable type of permanent magnet can be used in my magnetic rake arrangement. The wire screens 7 and 8 serve to diffuse the liquid through which the rake is drawn and cause it to pass evenly around the magnets. This screen, if of iron wire, also acquires some magnetic properties itself and serves to assist in removing the magnetic particles from the bath.

In use the rake is grasped by the handle 6 and drawn slowly through the solution in the tank several times at different levels. After withdrawing the rake it is washed off and the particles of iron adhering thereto are removed by brushing or by an air blast.

By the use of my magnetic rake a ground coat dipping tank, or any other tank of fluid which may contain magnetic materials, can be easily kept from reaching a point of harmful concentration of such particles. The operation of drawing the rake through the fluid in the tank takes only a few minutes and production can then be immediately resumed. No particular skill is required in the operation and upkeep of my rake is negligible.

Although I have described in considerable detail the illustrated embodiments of my invention it will be understood by those skilled in the art that modifications and variations may be made in the specific form thereof. I do not, therefore, wish to be limited to the exact construction illustrated and described herein but claim as my invention all embodiments coming within the scope of the appended claims.

I claim:

1. A magnetic rake of the type described comprising a spacing bar member, a row of permanent horseshoe type magnets disposed with their closed ends engaging one side of said bar, a second row of permanent horseshoe type magnets disposed with their closed ends engaging the opposite side of said spacing bar, the closed ends of the magnets of each of said rows of magnets being spaced apart and the magnets of one row being disposed substantially midway between the magnets of the other row, clamping and retaining bars adapted to engage the outer surfaces of each of said rows of magnets, wire screen members disposed between said clamping bars and the outer surfaces of said rows of magnets and extending over the outer surface of each row of magnets, and a plurality of clamping members extending through said screens, retaining bars and spacing bar, each of said clamping members passing through the closed end of a single magnet whereby the screens and bars are held in assembled relation and each magnet is provided with an individual support.

2. A magnetic rake of the type described comprising a spacing bar member, a row of permanent horseshoe type magnets disposed with their closed ends engaging one side of said bar, a second row of permanent horsehoe type magnets disposed with their closed ends engaging the opposite side of said spacing bar, the closed ends of the magnets of each of said rows of magnets being spaced apart and the magnets of one row being disposed substantially midway between the magnets of the other row, clamping and retaining bars adapted to engage the outer surfaces of each of said rows of magnets, wire screen members disposed between said clamping bars and the outer surfaces of said rows of magnets and extending over the outer surface of each row of magnets, and a plurality of clamping members extending through said screens, retaining bars and spacing bar, each of said clamping members passing through the closed end of a single magnet whereby the screens and bars are held in assembled relation and each magnet is provided with an individual support, the magnets of each row being arranged with adjacent poles of the same polarity.

CLARENCE D. PARKHILL.